(12) United States Patent
Campaniello et al.

(10) Patent No.: US 9,797,058 B2
(45) Date of Patent: *Oct. 24, 2017

(54) PROCESS FOR MANUFACTURING A RECOVERY ANNEALED COATED STEEL SUBSTRATE FOR PACKAGING APPLICATIONS AND A PACKAGING STEEL PRODUCT PRODUCED THEREBY

(71) Applicant: TATA STEEL IJMUIDEN BV, Velsen-Noord (NL)

(72) Inventors: Jean Joseph Campaniello, Heerhugowaard (NL); Jacques Hubert Olga Joseph Wijenberg, Amsterdam (NL); Ilja Portegies Zwart, Wormer (NL)

(73) Assignee: TATA STEEL IJMUIDEN BV, Velsen-Noord (NL)

( * ) Notice: Subject to any disclaimer, the term of this patent is extended or adjusted under 35 U.S.C. 154(b) by 573 days.

This patent is subject to a terminal disclaimer.

(21) Appl. No.: 14/387,537

(22) PCT Filed: Mar. 28, 2013

(86) PCT No.: PCT/EP2013/056780
§ 371 (c)(1),
(2) Date: Sep. 23, 2014

(87) PCT Pub. No.: WO2013/144320
PCT Pub. Date: Oct. 3, 2013

(65) Prior Publication Data
US 2015/0044500 A1 Feb. 12, 2015

(30) Foreign Application Priority Data

Mar. 30, 2012 (EP) ..................... 12162441

(51) Int. Cl.
| | | |
|---|---|---|
| C25D 5/36 | (2006.01) |
| C21D 1/72 | (2006.01) |
| C21D 8/02 | (2006.01) |
| C21D 8/04 | (2006.01) |
| C25D 5/50 | (2006.01) |
| C25D 5/12 | (2006.01) |
| C21D 1/26 | (2006.01) |
| C21D 1/42 | (2006.01) |
| C21D 1/60 | (2006.01) |
| C21D 1/667 | (2006.01) |
| C21D 1/76 | (2006.01) |
| C21D 6/00 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C23F 17/00 | (2006.01) |
| B05D 7/14 | (2006.01) |
| B32B 15/01 | (2006.01) |
| C21D 1/18 | (2006.01) |
| C21D 9/46 | (2006.01) |
| C25D 3/06 | (2006.01) |

(52) U.S. Cl.
CPC .............. C25D 5/36 (2013.01); B05D 7/14 (2013.01); B32B 15/011 (2013.01); C21D 1/18 (2013.01); C21D 1/26 (2013.01); C21D 1/42 (2013.01); C21D 1/60 (2013.01); C21D 1/667 (2013.01); C21D 1/72 (2013.01); C21D 1/76 (2013.01); C21D 6/005 (2013.01); C21D 6/008 (2013.01); C21D 8/0226 (2013.01); C21D 8/0236 (2013.01); C21D 8/0247 (2013.01); C21D 8/0263 (2013.01); C21D 8/0278 (2013.01); C21D 8/0284 (2013.01); C21D 8/0478 (2013.01); C21D 8/0484 (2013.01); C21D 9/46 (2013.01); C22C 38/001 (2013.01); C22C 38/002 (2013.01); C22C 38/004 (2013.01); C22C 38/02 (2013.01); C22C 38/04 (2013.01); C22C 38/06 (2013.01); C22C 38/12 (2013.01); C22C 38/14 (2013.01); C23F 17/00 (2013.01); C25D 5/12 (2013.01); C25D 5/505 (2013.01); *C21D 2251/02* (2013.01); *C25D 3/06* (2013.01); *Y02P 10/253* (2015.11); *Y10T 428/12542* (2015.01); *Y10T 428/12569* (2015.01); *Y10T 428/12722* (2015.01)

(58) Field of Classification Search
None
See application file for complete search history.

(56) References Cited

U.S. PATENT DOCUMENTS 2,357,126 A 8/1944 Nachtman
3,174,917 A 3/1965 Lesney et al.
(Continued)

FOREIGN PATENT DOCUMENTS

DE 1483247 A1 3/1969
GB 1123189 A 8/1968
(Continued)

OTHER PUBLICATIONS

International Search Report dated Jun. 25, 2013 from International Application PCT/EP2013/056780 to Tata Steel Ijmuiden BV filed Mar. 28, 2013.
(Continued)

*Primary Examiner* — Daniel J Schleis
(74) *Attorney, Agent, or Firm* — Vory, Sater, Seymour and Pease LLP

(57) ABSTRACT

This relates to a process for manufacturing a recovery annealed coated steel substrate for packaging applications and a packaging steel product produced thereby.

30 Claims, No Drawings

(56) References Cited

U.S. PATENT DOCUMENTS

| | | | |
|---|---|---|---|
| 4,726,208 A | 2/1988 | Saunders | |
| 6,533,876 B1 | 3/2003 | Cornelissen et al. | |

FOREIGN PATENT DOCUMENTS

| | | |
|---|---|---|
| RU | 2082776 C1 | 4/1997 |
| RU | 2208485 C2 | 7/2003 |
| RU | 2381293 C2 | 2/2010 |
| WO | 2012045791 A1 | 4/2012 |
| WO | 2013144321 A1 | 10/2013 |

OTHER PUBLICATIONS

Search Report completed Mar. 9, 2017 for RU 2014143507/02(070206) to Tata Steel Ijmuiden BV filed Mar. 28, 2013.
Russian Office Action dated Apr. 28, 2017 for RU Application No. 2014143507/02(070206) to Tata Steel Ijmuiden BV filed Mar. 28, 2013.

PROCESS FOR MANUFACTURING A RECOVERY ANNEALED COATED STEEL SUBSTRATE FOR PACKAGING APPLICATIONS AND A PACKAGING STEEL PRODUCT PRODUCED THEREBY

CROSS-REFERENCE TO RELATED APPLICATIONS

This is a §371 US National Stage Application of International Application No. PCT/EP2013/056780 filed on Mar. 28, 2013, claiming the priority of European Patent Application No. 12162441.5 filed on Mar. 30, 2012.

FIELD OF THE INVENTION

This invention relates to a process for manufacturing a recovery annealed coated steel substrate for packaging applications and a packaging steel product produced thereby.

BACKGROUND OF THE INVENTION

Packaging steel is generally provided as single or double reduced tin mill products in thicknesses between 0.14 and 0.49 mm. A Single Reduced (SR) tin mill product is cold rolled directly to the finished gauge and then recrystallisation annealed. Recrystallisation is brought about by continuous annealing or batch annealing the cold rolled material. After annealing the material is usually temper rolled, typically by applying a thickness reduction of 1-2%, to improve the properties of the material. A Double Reduced (DR) tin mill product is given a first cold reduction to reach an intermediate gauge, recrystallisation annealed and then given another cold reduction to the final gauge. The resulting DR product is stiffer, harder, and stronger than SR, allowing customers to utilise lighter gauge steel in their application. These uncoated, cold rolled, recrystallisation annealed and optionally temper-rolled SR and DR packaging steels are referred to as blackplate. The first and second cold reduction may be given in the form of a cold rolling reduction in a cold-rolling tandem mill usually comprising a plurality of (usually 4 or 5) rolling stands.

Recovery Annealing (RA) is a cost effective method to produce packaging steels at a strength level comparable to Double Reduced (DR) grades, but with a better formability and notably elongation values. There are three stages in the annealing process, with the first being the recovery phase, which results in softening of the metal through a partial removal of crystal defects (the primary type of which are dislocations) and the decrease of the stored energy introduced during the deformation. Recovery phase covers all annealing phenomena that occur before the appearance of new strain-free grains. The second phase is recrystallisation, where new grains with high angle boundary nucleate and grow at the expense of grains with high stored energy. This is to be avoided in the process and product according to the invention because it leads to a sudden and dramatic decrease of the tensile properties and increase of the elongation values. The third stage is grain growth after recrystallisation.

Unfortunately a drawback of RA is that mechanical properties are usually non-homogeneous along the strip length and also from strip to strip. These variations in mechanical properties are the consequences of too dynamic a response of the grade and/or fluctuations of the temperature of the annealing furnace.

SUMMARY OF THE INVENTION

It is an object of the invention to provide better control of the recovery annealing conditions.

It is also an object of the invention to provide recovery annealed material with reproducible properties.

It is also an object of the invention to provide a more cost effective high strength steel for packaging purposes, which has a corrosion resistant outer surface.

DETAILED DESCRIPTION OF THE PREFERRED EMBODIMENTS

One or more of these objects is reached by a process for manufacturing a recovery annealed coated steel substrate for packaging applications, comprising the steps of:
  providing a steel slab or strip suitable for producing a low-carbon, an extra-low-carbon or an ultra-low-carbon hot rolled strip for producing packaging steel by hot rolling at a finishing temperature higher than or equal to the $Ar_3$ transformation point;
  cold-rolling the resulting steel strip to produce a single reduced steel substrate;
  electrodepositing a tin layer on one or both sides of the single reduced steel substrate to produce a tin-coated steel substrate, wherein the coating weight of the tin layer or layers onto one or both sides of the substrate is at most 1000 mg/m$^2$;
  annealing the tin-coated steel substrate at a temperature $T_a$ of at least 513° C. for an annealing time $t_a$:
    to convert the tin layer into an iron-tin alloy layer which contains at least 80 weight percent (wt. %) of FeSn (50 at. % iron and 50 at. % tin), and
    to simultaneously obtain a recovered microstructure and wherein no recrystallisation of the single reduced substrate takes place (i.e. recovery annealing);
  fast cooling the annealed substrate at a cooling rate of at least 100° C./s, and/or.

The conversion of the tin layer into an iron-tin alloy layer which contains at least 80 weight percent (wt. %) of FeSn (50 at. % iron and 50 at. % tin) implies that there is no unalloyed tin remaining on the substrate.

The invention is also embodied in a packaging steel product, such as a can, a can lid or a can bottom, comprising a low-carbon, an extra-low-carbon or an ultra-low carbon steel substrate provided on one or both sides with an iron-tin alloy layer which contains at least 80 weight percent (wt. %) of FeSn (50 at. % iron and 50 at. % tin) wherein the iron-tin alloy layer was produced by providing the substrate on the said one or both sides of the substrate with a tin layer followed by an annealing step at a temperature $T_a$ of at least 513° C. for an annealing time $t_a$ to form the iron-tin alloy layer and wherein the annealing step simultaneously provides a recovery annealed substrate, followed by fast cooling of the annealed substrate.

Preferred embodiments are provided in the dependent claims.

In the process according to the invention a steel slab or strip suitable for producing a low-carbon, an extra-low-carbon or an ultra-low-carbon hot rolled strip for producing packaging steel by hot rolling at a finishing temperature higher than or equal to the $Ar_3$ transformation point is provided. A low-carbon steel in the context of this invention has a carbon content of at most 0.05%, an extra-low-carbon steel has a carbon content of at most 0.02%, and an ultra-low-carbon has a carbon content of at most 0.003%. In an embodiment of the invention the steel is an interstitial free steel, preferably an ultra-low-carbon. In these steels the interstitial elements carbon and nitrogen are bound to elements like niobium.

The hot rolled steel is cold rolled to produce a single reduced (SR) steel substrate.

On the cold rolled, full-hard substrates, a layer of tin is subsequently deposited. The substrates are called full-hard substrates because the SR-substrate has not undergone a recrystallisation annealing after cold rolling step. So the microstructure of the substrate is still heavily deformed.

After the tinplating the tin-coated steel substrate is annealed at a temperature $T_a$ of at least 513° C. for an annealing time $t_a$ to convert the tin layer into an iron-tin alloy layer which contains at least 80 weight percent (wt. %) of FeSn (50 at. % iron and 50 at. % tin), and to simultaneously obtain a recovered microstructure and wherein no recrystallisation of the single reduced substrate takes place (i.e. recovery annealing). After this combined diffusion/recovery annealing the annealed substrate is cooled rapidly.

The temperature $T_a$ and the annealing time $t_a$ are relatively high and short, so that the diffusion annealing takes place while simultaneously recovery annealing the substrate. The reduction in tensile strength and yield strength remains limited due to the short annealing time, but the recovery effect generates a significant increase in elongation values. The process parameters are controlled very carefully because the time-temperature process window for diffusion annealing is critical in terms of obtaining the desired amounts of FeSn (50:50) in the diffusion alloy layer. As it is this layer that provides the corrosion protection, the control of these parameters is critical. This degree of control of the T-t-profile also ensures that the recovery process, which is a thermally activated process, is reproducible over the length and width of the strip, and from strip to strip.

The term 'recovered microstructure' is understood to mean a heat treated cold rolled microstructure which shows minimal or no recrystallisation, with such eventual recrystallisation being confined to localised areas such as at the edges of the strip. Preferably the microstructure is completely unrecrystallised. The microstructure of the packaging steel is therefore substantially or completely unrecrystallised. This recovered microstructure provides the steel with a significantly increased deformation capability at the expense of a limited decrease in strength.

The inventors found that is necessary to diffusion anneal a tin coated steel substrate at a temperature ($T_a$) of at least 513° C. to obtain the desired iron-tin coating layer. The diffusion annealing time ($t_a$) at the diffusion annealing temperature $T_a$ is chosen such that the conversion of the tin layer into the iron-tin layer is obtained. The predominant and preferably sole iron-tin alloy component in the iron-tin layer is FeSn (i.e. 50 atomic percent (at. %) iron and 50 at. % tin). It should be noted that the combination of diffusion annealing time and temperature are interchangeable to a certain extent. A high $T_a$ and a short $t_a$ will result in the formation of the same iron-tin alloy layer than a lower $T_a$ and a longer $t_a$. The minimum $T_a$ of 513° C. is required, because at lower temperatures the desired (50:50) FeSn layer does not form. Also the diffusion annealing does not have to proceed at a constant temperature, but the temperature profile can also be such that a peak temperature is reached. It is important that the minimum temperature of 513° C. is maintained for a sufficiently long time to achieve the desired amount of FeSn in the iron-tin diffusion layer. So the diffusion annealing may take place at a constant temperature $T_a$ for a certain period of time, or the diffusion annealing may, e.g., involve a peak metal temperature of $T_a$. In the latter case the diffusion annealing temperature is not constant. It was found to be preferable to use a diffusion annealing temperature $T_a$ of between 513 and 645° C., preferably of between 513 and 625° C. At a lower $T_a$ the recovery process proceeds more slowly. The maximum temperature is limited by the window for forming FeSn and by the recrystallisation temperature of the deformed substrate.

In an embodiment of the invention, the maximum annealing temperature is limited to 625° C., and preferably the maximum annealing temperature is limited to 615° C.

The inventors found the highest FeSn content in the iron-tin alloy layer was obtained when the annealing temperature was chosen to be at least 550° C.

In a preferred embodiment a process for producing a coated substrate for packaging is provided wherein the time at $T_a$ is at most 4 seconds, preferably at most 2 seconds, and more preferably wherein there is no dwell time at $T_a$. In the latter case the diffusion annealing takes place by heating the substrate to the peak metal temperature of $T_a$ after which the substrate is cooled. The short dwell time at $T_a$ allows the production of the iron-tin alloy layer in an appropriately modified conventional tinplating line. Careful control of these parameters ensures a reproducible recovery annealing process.

The mechanical properties of recovery annealed steel depend on the composition of the grade, the cold rolling reduction and the difference between the recovery annealing temperature and the recrystallisation temperature. Therefore, the final mechanical properties can be controlled in principle by limiting the release of the stored energy by choosing the right annealing cycle. More particularly, between steel sheets made from the same grade and having the same processing history (hot rolling, cold rolling reduction) and equivalent annealing cycles the release of the stored energy can be estimated using the following formula:

$$M=(T_a+273)(\log t_a+20)\times 10^{-3}$$

where $T_a$ is in ° C. Steel sheets with a similar M coefficient will have similar mechanical properties. By selecting the correct values for $T_a$ and $t_a$ the desired properties of the recovery annealed substrate and the iron-tin alloy layer can be determined.

In a preferred embodiment the iron-tin alloy layer contains at least 85 wt. % of FeSn, preferably at least 90 wt. %, more preferably at least 95 wt. %. The FeSn layer is a layer fully covering the substrate surface. The higher the fraction of FeSn, the better the corrosion protection of the substrate will be. Although ideally the iron-tin alloy layer consists of FeSn only, it appears to be difficult to prevent the presence of very small fractions of other compounds such as α-Sn, β-Sn, $Fe_3Sn$ or oxides. However, these small fractions of other compounds have been found to have no impact on the product performance in any way. It must be noted that there are no other $Fe_xSn_y$-layers present but the FeSn layer on the substrate. There is also no unalloyed tin remaining on the substrate.

The time at $T_a$ may not exceed a critical time to avoid the onset of recrystallisation. In a preferred embodiment a process for producing a coated substrate for packaging is provided wherein the time at $T_a$ is at most 4 seconds, preferably at most 2 seconds, and more preferably wherein there is no dwell time at $T_a$. In the latter case the diffusion annealing takes place by heating the substrate to the peak metal temperature of $T_a$ after which the substrate is cooled. The short dwell time at $T_a$ allows the production of the iron-tin alloy layer with a recovered substrate in an appropriately modified conventional tinplating line and, in addition, the recrystallisation of the deformed substrate is prevented.

In an embodiment of the invention the iron-tin alloy layer or layers are provided with a chromium metal—chromium oxide coating layer produced by a trivalent chromium electroplating process as described in the co-pending application (EP12162415.9).

In an embodiment of the invention a process is provided wherein the annealing is performed in a reducing gas atmosphere, such as HNX, while keeping the coated substrate in a reducing or inert gas atmosphere prior to cooling using non-oxidising or mildly oxidising cooling medium, so as to obtain a robust, stable surface oxide.

In an embodiment of the invention the fast cooling after diffusion/recovery annealing is achieved by means of quenching with water, wherein the water used for quenching has a temperature between room temperature and its boiling temperature. It is important to maintain a homogeneous cooling rate over the strip width during cooling to eliminate the risks of the strip getting deformed due to cooling buckling. This can be achieved by applying cooling water through a (submerged) spray system that aims to create an even cooling pattern on the strip surface. To ensure a homogeneous cooling rate during spraying it is preferred to use cooling water with a temperature between room temperature and 60° C. to prevent that the water reaches boiling temperatures upon contact with the hot steel strip. The latter can result in the onset of localized (unstable) film boiling effects that can lead to uneven cooling rates over the surface of the steel strip, potentially leading to the formation of cooling buckles.

In an embodiment of the invention the annealing process comprises i) the use of a heating unit able to generate a heating rate preferably exceeding 300° C./s, like an inductive heating unit, in a hydrogen containing atmosphere such as HNX, and/or ii) followed by a heat soak which is kept at the annealing temperature to homogenise the temperature distribution across the width of the strip, and/or iii) wherein the cooling is preferably performed in an reducing gas atmosphere such as a HNX atmosphere, and/or iv) the cooling is preferably performed by means of water quenching, by using (submerged) spraying nozzles, wherein the water used for quenching has a minimal dissolved oxygen content and has a temperature between room temperature and 60° C., while keeping the substrate with the iron-tin alloy layer(s) shielded from oxygen by maintaining an inert or reducing gas atmosphere, such as HNX gas, prior to quenching.

In an embodiment of the invention the coating weight of the tin layer or layers onto one or both sides of the substrate is at least 100 and/or at most 600 mg/m$^2$ of substrate surface.

In an embodiment of the invention the steel comprises (in weight. %):
 a carbon content of 0.05% or less, and/or
 a nitrogen content of 0.004% or less, and/or
 a manganese content between 0.05 to 0.5%, and/or
 a phosphorous content of 0.02% or less, and/or
 a silicon content of 0.02% or less, and/or
 a sulphur content of 0.03% or less, and/or
 an aluminum content of 0.1% or less, and/or
 optionally one or more of a niobium content between 0.001% and 0.1%, a titanium content between 0.001% and 0.15%, a vanadium content between 0.001% and 0.2%, a zirconium content between 0.001% and 0.1%, and a boron content between 5 and 50 ppm, and/or
 the remainder being iron and unavoidable impurities.

In a preferred embodiment of the invention the carbon content is at most 0.02%, preferably at most 0.003%, and/or the niobium content is at least 0.02 and/or at most 0.08%, and/or the manganese content is at least 0.2 and/or at most 0.4%. Preferably the niobium content is at least 0.03 and/or at most 0.06%.

By choosing a carbon content of 0.003 or lower and a suitably high niobium content, the steel becomes interstitial free, meaning that the carbon and nitrogen in the steel become attached to niobium. This results in a steel of which the properties are not affected by the ageing phenomenon. Interstitial atoms, such as carbon and nitrogen, have a marked effect on the deformation behaviour of steel. Discontinuous yielding in steel is strongly related to interstitials and may result in Luders bands, which are detrimental to surface appearance, and may also promote premature breakage during forming or non-uniform springback after deformation. In order to combat the detrimental effects of interstitial species, interstitial-free steels are essentially devoid of solute carbon and nitrogen. These "interstitial-free" steels predominantly rely upon the solid state precipitation of carbides, nitrides, and carbosulfides to reduce the solute interstitial content. Additionally, the total carbon and nitrogen contents are reduced to extremely low levels, typically less than 0.003 weight percent carbon and less than 0.006 weight percent nitrogen through modern steelmaking techniques.

In an embodiment the coated substrate is further provided with an organic coating, consisting of either a thermoset organic coating, or a thermoplastic single layer coating, or a thermoplastic multi-layer polymer coating.

In a preferred embodiment the thermoplastic polymer coating is a polymer coating system comprising one or more layers comprising the use of thermoplastic resins such as polyesters or polyolefins, but can also include acrylic resins, polyamides, polyvinyl chloride, fluorocarbon resins, polycarbonates, styrene type resins, ABS resins, chlorinated polyethers, ionomers, urethane resins and functionalised polymers. For clarification:
 Polyester is a polymer composed of dicarboxylic acid and glycol. Examples of suitable dicarboxylic acids include therephthalic acid, isophthalic acid, naphthalene dicarboxylic acid and cyclohexane dicarboxylic acid. Examples of suitable glycols include ethylene glycol, propane diol, butane diol, hexane diol, cyclohexane diol, cyclohexane dimethanol, neopentyl glycol etc. More than two kinds of dicarboxylic acid or glycol may be used together.
 Polyolefins include for example polymers or copolymers of ethylene, propylene, 1-butene, 1-pentene, 1-hexene or 1-octene.
 Acrylic resins include for example polymers or copolymers of acrylic acid, methacrylic acid, acrylic acid ester, methacrylic acid ester or acrylamide.
 Polyamide resins include for example so-called Nylon 6, Nylon 66, Nylon 46, Nylon 610 and Nylon 11.
 Polyvinyl chloride includes homopolymers and copolymers, for example with ethylene or vinyl acetate.
 Fluorocarbon resins include for example tetrafluorinated polyethylene, trifluorinated monochlorinated polyethylene, hexafluorinated ethylene-propylene resin, polyvinyl fluoride and polyvinylidene fluoride.
 Functionalised polymers for instance by maleic anhydride grafting, include for example modified polyethylenes, modified polypropylenes, modified ethylene acrylate copolymers and modified ethylene vinyl acetates.

Mixtures of two or more resins can be used. Further, the resin may be mixed with anti-oxidant, heat stabiliser, UV absorbent, plasticiser, pigment, nucleating agent, antistatic agent, release agent, anti-blocking agent, etc. The use of such thermoplastic polymer coating systems have shown to provide excellent performance in can-making and use of the can, such as shelf-life.

According to a second aspect a packaging steel is provided that comprises a low-carbon, an extra-low-carbon or an ultra-low carbon steel substrate provided on one or both sides with an iron-tin alloy layer which contains at least 80 weight percent (wt. %) of FeSn (50 at. % iron and 50 at. % tin) wherein the iron-tin alloy layer was produced by providing the substrate on the said one or both substrates with a tin layer followed by an annealing step at a temperature $T_a$ of at least 513° C. for an annealing time $t_a$ to form the iron-tin alloy layer and wherein the annealing step simultaneously provides a recovery annealed substrate, followed by fast cooling of the annealed substrate.

This steel is both provided with a corrosion resistant coating in the form of the iron/tin alloy layer and a good strength/elongation ratio as a result of the recovery annealed full hard cold rolled (SR) steel substrate.

In an embodiment of the invention a packaging steel product is provided wherein the steel substrate comprises (in weight percent):
- 0.05% or less C,
- 0.004% or less N,
- 0.05% to 0.5% Mn,
- 0.02% or less P,
- 0.02% or less Si,
- 0.03% or less S,
- 0.1% or less Al,
- optionally one or more of 0.001% to 0.1% Nb, 0.001% to 0.15% Ti, 0.001% to 0.2% V, 0.001% to 0.1% Zr, 5 to 50 ppm B,
- the remainder being iron and unavoidable impurities;

In a preferred embodiment a packaging steel product is provided wherein:
- the carbon content is at most 0.02%, and/or
- the niobium content is at least 0.02 and/or at most 0.08%, preferably at least 0.03 and/or at most 0.06 and/or
- the manganese content is at least 0.2 and/or at most 0.4%.

Preferably the carbon content of the steel according to the invention has a carbon content of at most 0.003%. More preferably the steel substrate is an interstitial free steel.

Strip shape problems are not expected to occur with an IF-steel after the recovery annealing process. The strip flatness is affected by internal-stresses which in turn originate from a non-homogenous microstructure due to a variation of the annealing temperature. The variation of mechanical properties is sluggish for a Nb-IF grade. With a variation in annealing temperature the change in mechanical properties is relatively small (e.g. 35 MPa for a change in temperature of 50° C.) whereas for LC steel a difference of about 70 MPa is expected for Rp and Rm, for a recovery annealed low-C steel. So LC-steels are more critical to produce than IF-grades.

However, if the strip shape or surface texture (e.g. roughness) would require some minor corrections or if the product needs to be supplied in a condition that the yield point is suppressed, then the invention is also embodied in a process wherein the coated and annealed substrate is temper rolled or subjected to tension levelling wherein the reduction of the substrate is between 0.5 and 3% temper rolling reduction or the equivalent reduction in tension levelling. Interstitial free steels do not age as a result of the absence of free interstitials, and therefore the only reason to temper roll interstitial free steels would be for shape correction or surface texture. Temper rolling can also be performed after the substrate was coated with the thermoset organic coating, or a thermoplastic single layer coating, or a thermoplastic multi-layer polymer coating. A temper rolled single reduced substrate is not considered a DR substrate.

The invention will now be further explained by means of the following, non-limitative examples.

TABLE 1

| Steel composition in 1/1000 wt. % | | | | | | | | |
|---|---|---|---|---|---|---|---|---|
| | C | Mn | Nb | N | Al$_{sol}$ | S | P | Si | Ti |
| LC | 32 | 180 | tr | 3.7 | 52 | 6 | 14 | 3 | tr |
| Nb40 | 3 | 350 | 43 | 2.5 | 60 | 5 | 4 | 32 | tr |
| Ti108 | 12 | 210 | tr | 3.0 | 53 | 6 | 6 | 12 | 108 |
| Nb-LC | 58 | 400 | 14 | 4.0 | 63 | 6 | 7 | 34 | tr |
| ULC | 2 | 270 | tr | 3.0 | 12 | 9 | 9 | 60 | tr | tr = trace, impurity only

TABLE 2

| Mechanical properties before and after recovery annealing | | | | |
|---|---|---|---|---|
| | TS FH (MPa) | A-FH (%) | TS RA (MPa) | A-RA (%) |
| LC | 780 | 2.0 | 670 | 4.5 |
| Nb40 | 834 | 1.5 | 688 | 4.5 |
| Ti108 | 730 | 1.0 | 700 | 4.0 |
| Nb-LC | 870 | 0.5 | 830 | 3.0 |
| ULC | 400 | 2.0 | 350 | 4.0 |

At a selected annealing time, the recovery annealing window is between the recrystallisation start temperature and the temperature from which the material is considered to behave as full-hard. The temperature from which the steel is considered to behave as a full-hard material is estimated to be at 200° C. below the recrystallisation start temperature. The recrystallisation start temperature for Nb40 has been determined to be 710° C. from an analysis of the microstructure and the mechanical properties in which FH specimens were treated at different temperatures for 60 s. Therefore the recovery annealing range for grade Nb40 is estimated to lie between 710° C. and 510° C. In principle, each temperature above 510° C. can be used to obtain a recovery annealed Nb40 steel. However, the minimum temperature to obtain the desired iron-tin alloy layer is at least 513° C. To keep the annealing times low, it is preferable to anneal at a temperature of at least 550° C. Experiments were also performed at the highest allowable temperature of 625° C. for 4 s. According to the formula above these conditions correspond to an annealing at 576° C. for 60 s in a standard continuous annealing line.

The annealing parameters used were: Heating rate to $T_a$: 300 C°/s, $T_a$ between 550 and 625° C., $t_a$ between 4 and 60 s, cooling rate after annealing 100° C./s (Table 3).

TABLE 3

| Rp, Rm and A % values of Nb40 samples (FH and 100% Rex are reference values (Reference)). | | | | | |
|---|---|---|---|---|---|
| | Rp (MPa) | Rm (MPa) | A (%) | $T_a$ (° C.) | $t_a$ (s) | |
| FH | 815 | 834 | 1.5 | — | — | Reference |
| RA-4 s | 612 | 688 | 4.5 | 620 | 4 | Inventive |

TABLE 3-continued

Rp, Rm and A % values of Nb40 samples (FH and 100% Rex are reference values (Reference)).

|  | Rp (MPa) | Rm (MPa) | A (%) | $T_a$ (° C.) | $t_a$ (s) |  |
| --- | --- | --- | --- | --- | --- | --- |
| RA-10 s | 640 | 708 | 4.7 | 629 | 10 | Inventive |
| RA-60 s | 649 | 715 | 4.7 | 600 | 60 | Inventive |
| RA-26 s | 572 | 647 | 4.4 | 622 | 26 | Inventive |
| 100% Rex | 216 | 377 | 20 | 720 | 36 | Reference |

The Nb40 grade is an IF grade. Therefore strip shape problems are not expected to occur after the recovery annealing process.

The invention claimed is:

1. A process for manufacturing a recovery annealed coated steel substrate for packaging applications, comprising the steps of:
   providing a steel slab or strip suitable for producing a low-carbon, an extra-low-carbon or an ultra-low-carbon hot rolled strip for producing packaging steel by hot rolling at a finishing temperature higher than or equal to the $Ar_3$ transformation point;
   cold-rolling the resulting steel strip to produce a single reduced steel substrate;
   electrodepositing a tin layer on one or both sides of the single reduced steel substrate to produce a tin-coated steel substrate, wherein the coating weight of the tin layer or layers onto one or both sides of the substrate is at most 1000 mg/m$^2$;
   heating the tin-coated steel substrate at a heating rate exceeding 300° C./s followed by annealing the tin-coated steel substrate at a temperature $T_a$ of between 513° C. and 645° C. for an annealing time $t_a$:
   to convert the tin layer into an iron-tin alloy layer which contains at least 90 weight percent of FeSn, and
   to simultaneously obtain a recovered microstructure and wherein no recrystallisation of the single reduced substrate takes place;
   fast cooling the annealed substrate at a cooling rate of at least 100° C./s;
   wherein the steel comprises in weight percentage:
   a carbon content of 0.05% or less;
   a nitrogen content of 0.004% or less;
   a manganese content between 0.05 and 0.5%;
   a phosphorous content of 0.02% or less;
   a silicon content of 0.02% or less;
   a sulphur content of 0.03% or less;
   an aluminium content of 0.1% or less;
   optionally one or more of
   a niobium content between 0.001% and 0.1%;
   a titanium content between 0.001% and 0.15%;
   a vanadium content between 0.001% and 0.2%;
   a zirconium content between 0.001% and 0.1%;
   a boron content between 5 and 50 ppm;
   the remainder being iron and unavoidable impurities.

2. The process for producing a coated substrate for packaging applications according to claim 1, wherein $t_a$ is at most 4 s.

3. The process according to claim 1, wherein the annealing is performed in a reducing gas atmosphere while keeping the coated substrate in a reducing or inert gas atmosphere prior to cooling using non-oxidising or mildly oxidising cooling medium, to obtain a robust, stable surface oxide.

4. The process according to claim 1, wherein the fast cooling is achieved by water quenching, wherein the water used for quenching has a temperature between room temperature and 80° C., and wherein the quenching process is designed to create and maintain a homogeneous cooling rate over the strip width.

5. The process according to claim 1, wherein the annealing process comprises:
   use of an inductive heating unit to generate the heating rate exceeding 300° C./s in a hydrogen containing atmosphere, and/or
   followed by a heat soak kept at the annealing temperature to homogenise the temperature distribution across the width of the strip, and/or
   wherein the cooling is performed in an reducing gas atmosphere, and/or
   the cooling is performed by means of water quenching, by using submerged spraying nozzles, wherein the water used for quenching has a minimal dissolved oxygen content and/or has a temperature between room temperature and 60° C., while keeping the substrate with the iron-tin alloy layer(s) shielded from oxygen by maintaining an inert or reducing gas atmosphere prior to quenching.

6. The process according to claim 1, wherein the coating weight of the tin layer or layers onto one or both sides of the substrate is at least 100 and/or at most 600 mg/m$^2$ of substrate surface.

7. The process according to claim 1, wherein
   the carbon content is at most 0.02%,
   the niobium content is at least 0.02 and at most 0.08%, and
   the manganese content is at least 0.2 and at most 0.4%.

8. The process according to claim 1, wherein the coated substrate is further provided with an organic coating, comprising either a thermoset or thermoplastic single or multi-layer polymer coating.

9. The process according to claim 1, wherein the coated substrate is temper rolled.

10. A packaging steel product comprising a low-carbon, an extra-low-carbon, or an ultra-low carbon steel recovery annealed substrate provided on one or both sides with an iron-tin alloy layer which contains at least 90 weight percent of FeSn produced according to claim 1, wherein the steel substrate comprises in weight percent:
    0.05% or less C,
    0.004% or less N,
    0.05% to 0.5% Mn,
    0.02% or less P,
    0.02% or less Si,
    0.03% or less S,
    0.1% or less Al,
    optionally one or more of 0.001% to 0.1% Nb, 0.001% to 0.15% Ti, 0.001% to 0.2% V, 0.001% to 0.1% Zr, 5 to 50 ppm B,
    the remainder being iron and unavoidable impurities.

11. The packaging steel product according to claim 10, wherein:
    the carbon content is at most 0.02%,
    the niobium content is at least 0.02 and at most 0.08%, and
    the manganese content is at least 0.2 and at most 0.4%.

12. The packaging steel product according to claim 10, wherein the coated substrate is further provided with an organic coating comprising either a thermoset or thermoplastic single or multi-layer polymer coating.

13. The process according to claim 1, wherein the tin layer converts into an iron-tin alloy layer which contains at least 95 weight percent of FeSn.

14. The process according to claim 1, wherein the fast cooling is achieved by water quenching, wherein the water used for quenching has a temperature between room temperature and 60° C., and wherein the quenching process is designed to create and maintain a homogeneous cooling rate over the strip width.

15. The process according to claim 1, wherein:
the carbon content is at most 0.003%,
the niobium content is at least 0.03% and at most 0.06%, and
the manganese content is at least 0.2% and at most 0.4%.

16. The process according to claim 1, wherein the thermoplastic polymer coating is a polymer coating system comprising one or more layers comprising a thermoplastic resin selected from the group consisting of polyesters, polyolefins, acrylic resins, polyamides, polyvinyl chloride, fluorocarbon resins, polycarbonates, styrene resins, ABS resins, chlorinated polyethers, ionomers, urethane resins, functionalised polymers thereof, copolymers thereof, and blends thereof.

17. The process according to claim 3, wherein the reducing gas atmosphere is and HNX reducing atmosphere.

18. The packaging steel product according to claim 10, wherein:
the carbon content is at most 0.003%,
the niobium content is at least 0.03% and at most 0.06%, and
the manganese content is at least 0.2% and at most 0.4%.

19. The packaging steel product according to claim 10, wherein the thermoplastic polymer coating is a polymer coating system comprising one or more layers comprising a thermoplastic resin selected from group consisting of polyesters, polyolefins, acrylic resins, polyamides, polyvinyl chloride, fluorocarbon resins, polycarbonates, styrene type resins, ABS resins, chlorinated polyethers, ionomers, urethane resins, functionalised polymers thereof, copolymers thereof, and blends thereof.

20. The packaging steel product according to claim 10, wherein the iron-tin alloy layer contains at least 95 weight percent of FeSn.

21. The process according to claim 1, wherein
the carbon content is at most 0.02%.

22. The process according to claim 1, wherein
the niobium content is at least 0.02 and at most 0.08%.

23. The process according to claim 1, wherein
the manganese content is at least 0.2 and at most 0.4%.

24. The packaging steel product according to claim 10, wherein:
the carbon content is at most 0.02%.

25. The packaging steel product according to claim 10, wherein:
the niobium content is at least 0.02 and at most 0.08%.

26. The packaging steel product according to claim 10, wherein:
the manganese content is at least 0.2 and at most 0.4%.

27. The process according to claim 1, wherein:
the carbon content is at most 0.003%.

28. The process according to claim 1, wherein:
the niobium content is at least 0.03% and at most 0.06%.

29. The packaging steel product according to claim 10, wherein:
the carbon content is at most 0.003%.

30. The packaging steel product according to claim 10, wherein:
the niobium content is at least 0.03% and at most 0.06%.

* * * * *